United States Patent
Hewitt et al.

(10) Patent No.: US 10,984,191 B2
(45) Date of Patent: Apr. 20, 2021

(54) EXPERIENTIAL PARSER

(71) Applicant: Verint Americas Inc., Alpharetta, GA (US)

(72) Inventors: Timothy James Hewitt, Spokane Valley, WA (US); Joseph Wayne Dumoulin, Spokane, WA (US)

(73) Assignee: VERINT AMERICAS INC., Alpharetta, GA (US)

( * ) Notice: Subject to any disclaimer, the term of this patent is extended or adjusted under 35 U.S.C. 154(b) by 228 days.

(21) Appl. No.: 16/145,582

(22) Filed: Sep. 28, 2018

(65) Prior Publication Data

US 2020/0104356 A1 Apr. 2, 2020

(51) Int. Cl.
*G06F 40/232* (2020.01)
*G06F 40/211* (2020.01)
*G06F 40/253* (2020.01)
*G06F 40/284* (2020.01)

(52) U.S. Cl.
CPC .......... *G06F 40/211* (2020.01); *G06F 40/232* (2020.01); *G06F 40/253* (2020.01); *G06F 40/284* (2020.01)

(58) Field of Classification Search
CPC .... G06F 40/284; G06F 40/232; G06F 40/253; G06F 40/242; G06F 40/211; G06F 40/268; G06F 40/30; G06F 40/53; G06F 40/289; G06F 40/205; G06F 40/237
See application file for complete search history.

(56) References Cited

U.S. PATENT DOCUMENTS

| | | | |
|---|---|---|---|
| 2007/0265829 A1* | 11/2007 | Turner | G06F 40/20 704/9 |
| 2010/0180198 A1* | 7/2010 | Iakobashvili | G06F 40/232 715/257 |
| 2014/0298168 A1* | 10/2014 | Son | G06F 40/232 715/257 |

(Continued)

FOREIGN PATENT DOCUMENTS

EP 2650776 10/2013

OTHER PUBLICATIONS

Search Report, dated Feb. 12, 2020, received in connection with EP Patent Application No. 19199977.0.

(Continued)

*Primary Examiner* — Huyen X Vo
(74) *Attorney, Agent, or Firm* — Meunier Carlin & Curfman LLC

(57) ABSTRACT

Experiential parsing (EP) is a technique for natural language parsing that falls into the category of dependency parsing. EP supports applications that derive meaning from chat language. An experiential language model parses chat data, and uses documented experiences with language without using automatic natural language processing (NLP) methods. A descriptive grammar is built at word level rather than a prescriptive grammar at phrase level. The experiential model is designed to understand that word "A" associates with word "B" by function "C". The experiential model understands the relationship between words, independent of whether or not the overall phrase structure is grammatical. A high accuracy of producing the syntactic roles (such as main verb, direct object, etc.) is attained even when confronted with a variety of agrammatical inputs.

17 Claims, 11 Drawing Sheets

(56) References Cited

U.S. PATENT DOCUMENTS

2017/0235721 A1* 8/2017 Almosallam ......... G06F 40/232
 704/9
2017/0242886 A1 8/2017 Jolley et al.

OTHER PUBLICATIONS

Bansal, S., "Ultimate Guide to Understand and Implement Natural Language Processing (with codes in Python)," retrieved on Feb. 11, 2020 from https://www.analyticsvidhya.com/blog/2017/01/ultimate-quide-to-understand-implernent-natural-language-processing-codes-in-python, 2017, 43 pages.
Nasr, A., et al. "Syntactic parsing of chat language in contact center conversation corpus," Proceedings of the SIGDIAL Conference, 2016, pp. 175-184.
Godfrey, J.J., et al., "Switchboard: Telephone speech corpus for research and development," Proceedings of the 1992 IEEE International Conference on Acoustics, Speech and Signal Processing (ICASSP'92), IEEE Computer Society, vol. 1, 1992, pp. 517-520.
Pyysalo, S., et al., "Lexical adaptation of link grammar to the biomedical sublanguage: a comparative evaluation of three approaches," BMC Bioinformatics, vol. 7, 2006, 9 pages.
Jetter, H.-C., et al., "Blended interaction: understanding natural human-computer interaction in post-WIMP interactive spaces," Personal and Ubiquitous Computing, vol. 18, No. 5, 2014, pp. 1139-1158.
Gaifman, H., "Dependency Systems and Phrase-Structure Systems," Information and Control, vol. 8, 1965, pp. 304-337.
Hagoort, P., "The fractionation of spoken language understanding by measuring electrical and magnetic brain signals," Philosophical Transactions of the Royal Society B, vol. 363, No. 1493, 2007, pp. 1005-1069.
Levine, R. D., et al., "Head-Driven Phrase Structure Grammar Linguistic Approach, Formal Foundations, and Computational Realization," Encyclopedia of Language and Linguistics, $2^{nd}$ ed., Oxford, Elsevier, 2006, 24 pages.
McCord, M. C., "Using Slot Grammar," Technical Report, IBM Research Division, RC23978 Revised (W1003-081), 2010, 68 pages.
Nivre, J., "Dependency parsing," Language and Linguistics Compass, vol. 4, No. 3, 2010, pp. 138-152.
Schneider, G. A., "A Linguistic Comparison of Constituency, Dependency and Link Grammar," Ph.D. thesis, University of Zurich, 1998, 204 pages.
Sleator, D. D. K., et al., "Parsing English with a Link Grammar," Technical Report, Carnegie Mellon University, School of Computer Science, 1991, 14 pages.
Yuan, J., et al., "Towards an Integrated Understanding of Speaking Rate in Conversation," Department of Linguistics, Linguistic Data Consortium, University of Pennsylvania, 2006, 4 pages.
Weisleder, A., et al., "Talking to children matters: Early language experience strengthens processing and builds vocabulary," Psychological Science, vol. 24, No. 11, 2013, pp. 2143-2152.
Loebner, H., "The Loebner Prize," annual competition in artificial intelligence, 1990, 1 page.

* cited by examiner

| Bring, v. | | | | | |
|---|---|---|---|---|---|
| Collocates | | | | | |
| Direction | Left Predictor | Collocate | POS | Role | Right Predictor |
| Left | | can | qv | qtype | |
| Left | | student | n | agent | |
| Left | | need | v | | |
| Right | a, det<br>my, det<br>their, det | bike | n | direct object | |
| Right | | to | p | | dorm, n<br>school, n<br>campus, n |
| Right | a, det<br>cellular, n | phone | n | direct object | |
| Environments | | | | | |
| Left | | | Right | | |
| 1 (qv, qtype), (pro, agent) | | | 1 (n, direct object), (p, ) | | |
| 2 (pro, agent) | | | 2 (n, direct object) | | |
| 3 | | | 3 (pro, direct object), (p, ), (p, ) | | |
| 4 (pro, agent), (v, ), (vaux, ) | | | 4 (n, direct object) | | |

EXPERIENTIAL PARSER

BACKGROUND

In spontaneous written human communication with commercial chatbots, errors in spelling, punctuation, and basic grammar occur regularly and unpredictably. The difficulty of automated parsing of chat language is compounded by the unpredictability of the structure of a chat. The chat could possibly be a keyword search, a single complete sentence, or contain multiple paragraphs of information, for example.

Natural language parsing can take a number of specific forms. In the context of automatic parsing, it most often takes the form of context free grammar (CFG) parsing, which is well known in the natural language processing (NLP) literature. The most accurate results for parsing come from this class of parser. CFG and probabilistic CFG parsing focus on sentences and properly constructed phrases in the language considered. To create and evaluate CFG parsing models, training and testing data is used that is written with proper grammar for the language being considered. Consequently, many test models are newspapers, book excerpts, or other edited text. When spoken language is used to create CFG models, hand-tagging and editing introduces special tags for agrammatical constructs.

Another class of parsing methods may be sub-classified as link grammars and head-dependency grammars. In each of these methods, the relationships between words is considered before the part of speech of each individual word or phrase. The importance of word relationship provides an alternative method for handling agrammatical and misspelled text.

Chat applications are ubiquitous in modern human-computer interfaces, but interpreting chat language automatically has proven challenging in many scenarios. Along with the regular challenges of natural language processing, chat language introduces agrammatical and misspelled language.

SUMMARY

An embodiment that is described herein provides a parsing system that parses agrammatical user input such as chat data. A misspelling database comprises a plurality of words and associated correct spellings of the plurality of words and alternate spellings of the plurality of words. A metadata from word form database comprises metadata associated with a plurality of word forms of the plurality of words. A usage data database comprises a plurality of collocates for the plurality of words and a plurality of syntax environments for the plurality of words. A spell checker receives a user input and checks the user input against the misspelling database and generates a plurality of word possibilities. A lemmatizer receives the word possibilities and checks the word possibilities against the word form database to adjust the word possibilities. A parser parses the word possibilities using the usage data database, generates a processed language output, and provides the processed language output to a chatbot.

In another embodiment, a method of parsing is provided. The method may include receiving a user input; determining a plurality of word possibilities of the user input using a plurality of words of the user input and associated correct spellings of the plurality of words and alternate spellings of the plurality of words; adjusting the plurality of word possibilities using metadata associated with at least some of the words in the plurality of word possibilities; parsing the adjusted plurality of word possibilities using a plurality of collocates and a plurality of syntax environments to generate a processed language output; and providing the processed language output to a chatbot.

In another embodiment, a system is provided that includes a parser that receives an input comprising a plurality of words, generates a plurality of collocate links among the plurality of words, generates a plurality of environment links among the plurality of words, removes at least one of the plurality of the collocate links or the environment links, and provides a processed language output. The system also includes a memory.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings:

FIG. 2 is a diagram of a visual representation of a usage data object for an example verb;

DETAILED DESCRIPTION

Experiential parsing (EP) is a technique for natural language parsing that falls into the category of dependency parsing. EP supports applications that derive meaning from chat language. An experiential language model parses chat data, and uses documented experiences with language without using automatic natural language processing (NLP) methods. A descriptive grammar is built at word level rather than a prescriptive grammar at phrase level. The experiential language model is designed to understand that word "A" associates with word "B" by function "C". The experiential model understands the relationship between words, independent of whether or not the overall phrase structure is grammatical. A high accuracy of producing the syntactic roles (such as main verb, direct object, etc.) is attained even when confronted with a variety of agrammatical inputs.

Thus, experiential parsing refers to a language model based on data from documented experiences with language and which relies on that data and does not use probabilistic mechanisms. This language model establishes the words that are allowed to be connected and the allowed syntactic situations. In an implementation, even if the phrase itself is agrammatical, it can be parsed by an experiential language model correctly so long as it meets the following criteria: (1) the spellings of the terms (i.e., the words) of the phrase are contained within the vocabulary, (2) the individual word usage is correct, and (3) the individual word usage is not novel. It is contemplated that the experiential parsing may be supplemented by a probabilistic mechanism in some implementations, such as where the three criteria above do not apply and/or to check the processed language output generated by the experiential parsing, for example.

Figure 1:
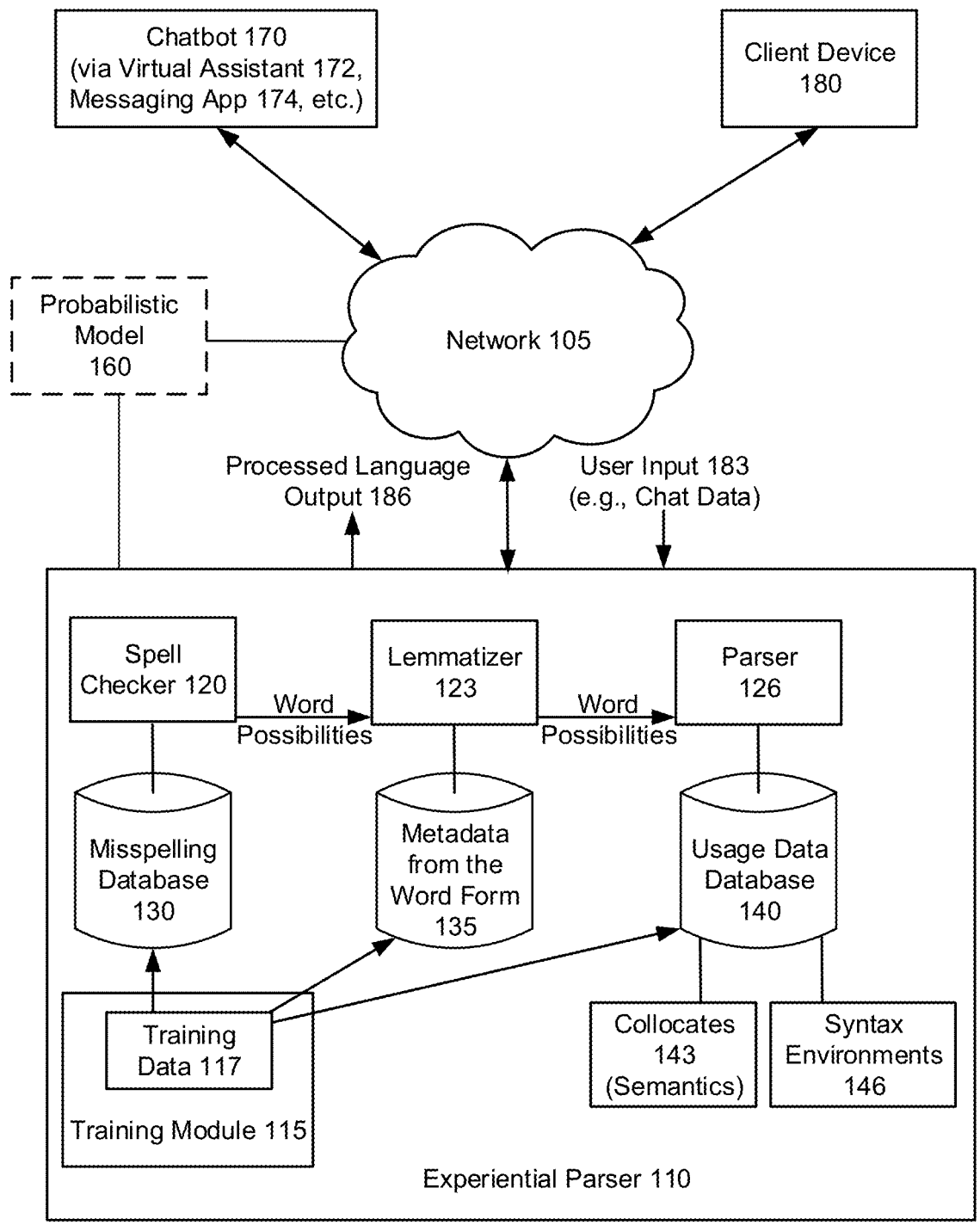
FIG. 1 is an illustration of an exemplary environment for experiential parsing.

FIG. 1 is an illustration of an exemplary environment 100 for experiential parsing. The environment 100 may include a chatbot 170, a client device 180, an experiential parser 110, and an optional probabilistic model 160 in communication through a network 105. The network 105 may be a variety of network types including the public switched telephone network (PSTN), a cellular telephone network, and a packet switched network (e.g., the Internet). Although only one chatbot 170 and one client device 180 are shown in FIG. 1, there is no limit to the number of chatbots and client devices that may be supported.

Figure 13:
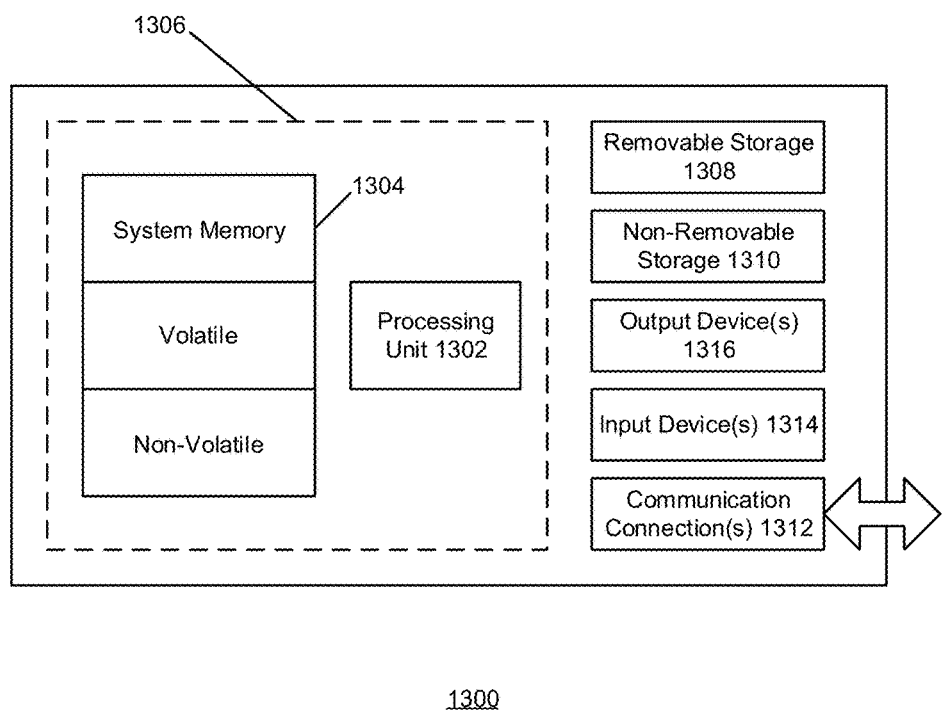
FIG. 13 shows an exemplary computing environment in which example embodiments and aspects may be implemented.

The chatbot 170, the client device 180, the experiential parser 110, and the probabilistic model 160 may each be implemented using a variety of computing devices such as smartphones, desktop computers, laptop computers, tablets, set top boxes, vehicle navigation systems, and video game consoles. Other types of computing devices may be supported. A suitable computing device is illustrated in FIG. 13 as the computing device 1300.

The chatbot 170 is in communication with the client device 180 and is capable of conducting a conversation with a user through the client device 180. The chatbot 170 may comprise a computer program or artificial intelligence application that conducts a conversation with the client device 180 via textual methods, in an implementation. Alternatively or additionally, the chatbot 170 may conduct a conversation with the client device via auditory methods. Depending on the implementation, the chatbot 170 may be accessed via a virtual assistant 172, a messaging app 174, or by other apps or websites.

User input 183, such as chat data, from the client device 180 is provided to the experiential parser 110. While chatbots encourage conversational interaction, the user input 183 may also comprise inputs that are keyword searches or non-conversational. Depending on the implementation, the user input 183 may be provided directly from the client device 180 (e.g., via the network 105) or from the chatbot 170 (e.g., via the network 105). As described further herein, the experiential parser 110 processes the user input 183 and outputs processed language output 186. In an implementation, the processed language output 186 may comprise the input's action, object, actor, indirect object, and/or their respective modifying details.

The experiential parser 110 may comprise a training module 115 that contains training data 117. The training data 117 is based on human to virtual assistant chat data for its parse objective. In an implementation, user inputs are captured from a commercial virtual agent chatbot and used for generating the training data 117. This data is typically short inputs ranging from two to 22 words with an average of 8.5 words. These inputs range between keyword searches and more conversational questions. The training data 117 may be weighted toward imperatives, statives, and interrogatives. In an implementation, the training data 117 is hand tagged.

In an implementation, the scope of language in the training data 117 is focused around a user instructing a chatbot to compose and send emails and text messages and make phone calls. This provides more data points for certain words in the corpus, but may result in a more limited vocabulary.

The experiential parser 110 does not evaluate the grammar of the user input 183. Accordingly, unlike conventional techniques, a phrase which can be understood by a human such as, "Who you think did hit John?" can be understood by the parser 110. The parser 110 accurately produces the roles of the sentence despite poor grammar. Rather than relying primarily on syntax and a probabilistic model, applying collocate level details with as much priority as syntax achieves an accurate parse.

The experiential parser 110 may comprise a spell checker 120 which uses a misspelling database 130, a lemmatizer 123 which uses a metadata from the word form database 135, and a parser 126 which uses a usage data database 140 as described further herein. The databases 130, 135, 140 may be populated using the training data (e.g., automatically or with human assistance) or may be obtained from storage, for example.

For the misspelling database 130, a misspelling is matched to all probable correct spellings to generate word possibilities. Additionally, contractions are split, common compounding errors are resolved, initialisms (MBA, OMG, CIA, etc.) are separated into their individual words, and abbreviations are normalized into their full words (their "spelled out" terms) to generate additional word possibilities. If a misspelling can be fit to more than one of these distinctions, each result is returned by the spell checker 120 as one of the word possibilities, e.g., "there" is matched to "there", "their", and "they are".

The metadata from the word form database 135 comprises the metadata that is gathered from the word form, namely, part of speech, tense, and root. Tenses are retained, but are not used in creating the parse. Only the root and part of speech are used in processing by the lemmatizer 123, and they are used to access the usage data database 140.

The usage data database 140 contains the usage data. As an example, FIG. 2 is a diagram 200 of a visual representation of a usage data object for the verb "bring" (e.g., from the phrase "Can I bring my bike to campus" shown in FIG. 3). The usage data is separated into two parts: the collocates 210 and the syntax environments 240, each attached to its respective part of speech. The collocates 210 show a direction (e.g., left or right), a direction predictor for left and right, the collocated word, the part of speech (pos) for the associated word (example parts of speech and their abbreviations are described further with respect to FIG. 4), and the role for the associated word. The environments 240 show various parts of speech and roles for each word that has a functional relationship to the word in the left and right directions.

Figure 3:
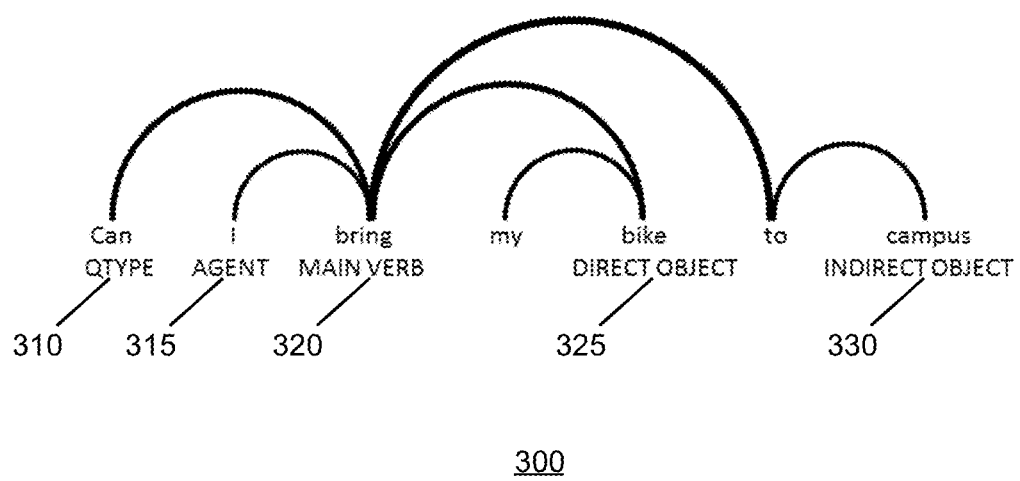
FIG. 3 is a diagram of a visual representation of an example parse with simplified grammar.

FIG. 3 is a diagram of a visual representation of a parse 300 with simplified grammar. The phrase "Can I bring my bike to campus" is parsed and shows the roles that are determined and assigned to each word. The word "Can" has the role of qtype 310, the pronoun "I" has the "agent" 315 role, "bring" is the main verb 320, "bike" is the direct object 325, and "campus" is the indirect object 330.

Figure 4:
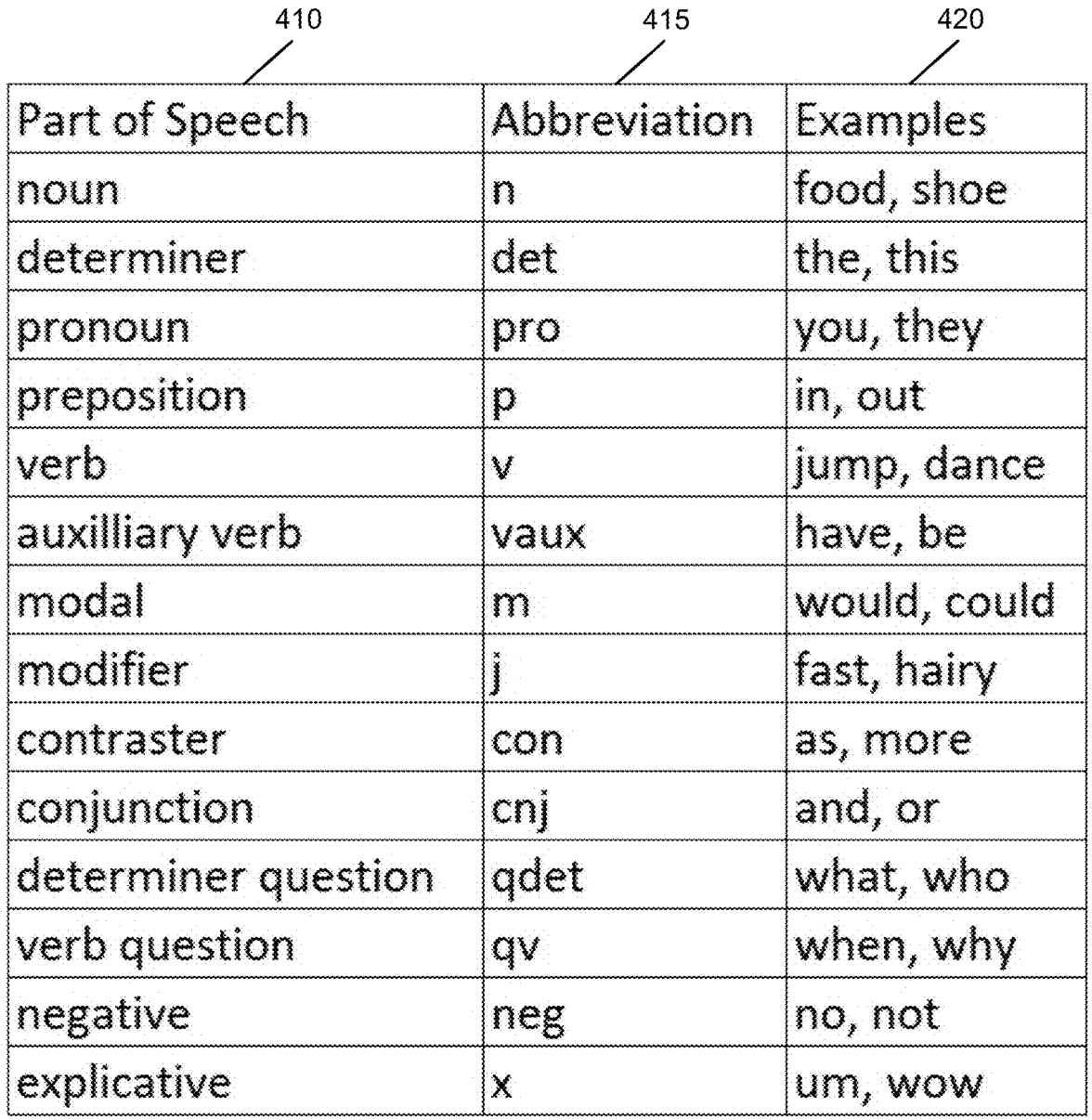
FIG. 4 is a diagram showing an example of a parts of speech list.

In order to better support the agrammatical inputs that are often encountered in chat language, a compressed grammar is provided. FIG. 4 is a diagram 400 showing an example of a parts of speech (pos) list. The supported parts of speech 410 are shown along with their respective abbreviations 415 and some example words 420 pertaining to the associated parts of speech 410 and abbreviations 415.

The usage database 140 uses collocates 143 which may be considered semantics, and syntax environments 146. Collocates (that is, words that are collocated with each other) are identified by the parser 126 and used in the determination of the valid juxtaposition of particular words of the user input 183.

Collocates are identified with respect to a 'root' word which is under consideration during processing. In an implementation, the collocate data comprises a list of collocates which have a demonstrated functional relationship to the root word. This creates a "bucket" of words to the left of a word and another to the right which are independent of each other.

Attached to the collocate data is the part of speech for the collocate and the allowed roles for the collocate. Also attached to the collocate is a predictor value. This predictor contains the collocates of the collocate and may be considered as another pair of buckets of words separated to the left and right of the collocate. The predictor value may be used to define allowed values and disambiguate unexpected links.

The syntax environments 146 identify the parts of speech of the words in a sentence that have a demonstrated functional relationship to the word to the left and right of the word and in order. For example, the first environment ("1") in FIG. 2 comes from the input "Can I bring my bike to campus" (also described further herein with respect to FIGS. 6-12). The words that have a direct functional relationship according to the parse rules are "can", "I", "bike", and "to". The representation of the environment is qv (verb question), pro (pronoun), BRING, n (noun), p (preposition).

The environment is separated to the left and right for ease in processing. In order to retain the cohesiveness of an environment, these individual environments are left and right dependent, meaning that the parts of speech of the related words to both left and right form a single unit. As a result, some left environments will be repeated because the right environment is not the same and vice versa. For example, in FIG. 2, environments 2 and 4 reflect the sentences, "I brought my bike", and "I want to bring my bike", respectively. Both have the same right environment, but are repeated because they have different left environments. This redundancy may be reduced by creating associated environments instead of dependent environments where a left environment can be associated with several right environments and vice versa. Positions within the environment contain role-assigning data.

In an implementation, a probabilistic model 160 may be used in conjunction with the experiential parser 110, e.g., to check the processed language output 186 and/or to resolve any user input 183 data that the experiential parser may have issues parsing if the user input 183 contains words and/or usages which have never before been encountered.

Figure 5:
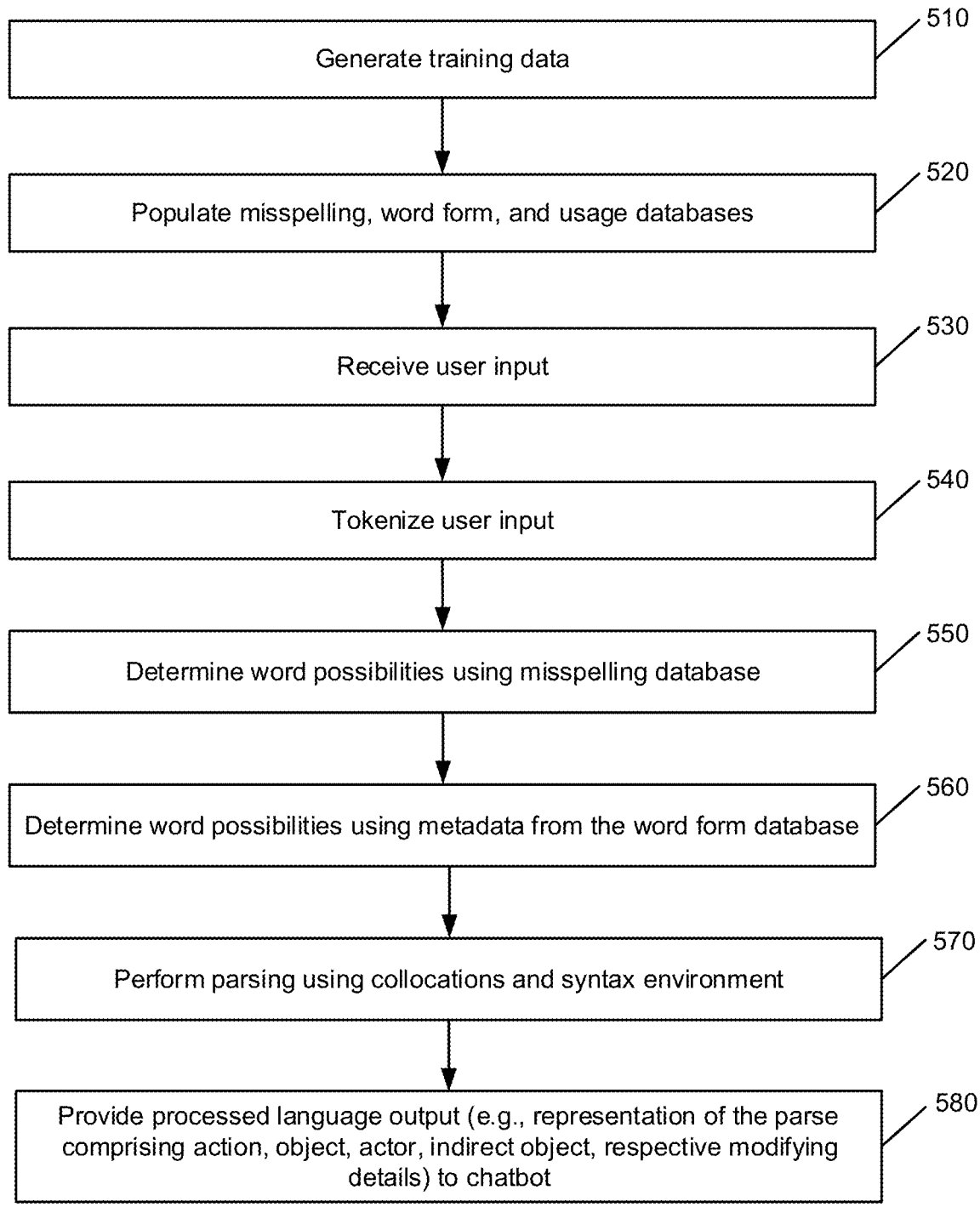
FIG. 5 is an operational flow of an implementation of a method for experiential parsing.

FIG. 5 is an operational flow of an implementation of a method 500 for experiential parsing. At 510, training data 117 may be generated or received by the training module 115. The misspelling database 130, the word form database 135, and the usage data database 140 are populated at 520, e.g., using the training data as set by a human or automatically by the parser 110 without human intervention.

At 530, user input is received. In an implementation, the client device 180 may receive the user input 183, such as chat data pursuant to a user interacting with the chatbot 170, e.g., via the virtual assistant 172, the messaging app 174, or the like.

At 540, the user input may be tokenized. Tokenization is the process of demarcating a string of input characters (i.e., breaking up a sequence of strings into pieces such as words, keywords, phrases, symbols and other elements called tokens). Any known technique for tokenization of user input may be used.

At 550, the resulting tokens (e.g., words) are checked against the misspelling database 130 by the spell checker 120 to determine the various word possibilities associated with each token. At 560, the determined word possibilities are checked against the word form database 135 by the lemmatizer 123 to further determine the word possibilities (e.g., the number of word possibilities may be increased or reduced).

At 570, parsing, using the parser 126, is performed using the collocates 143 and the syntax environments 146 via the usage data database 140 to generate processed language output 186. At 580, the processed language output 186 is provided to the chatbot 170.

Regarding elimination of the word possibilities, all word possibilities are valid until they are invalidated through an elimination process (e.g., at 550, 560, 570). For example, "ii" could be a misspelling for "I" or "it", and so it will be processed as both until one or the other is eliminated. If neither is eliminated, two separate and independent parses will be returned, one exclusive of the other. Another example is that "text" in modern English can be either noun or verb, so both possibilities will be perpetuated until one is eliminated. At the phrase level, the syntax rules for "bike" state that it can be a modifier of a noun to the right (bike lock, bike pedal). Because of this, "bike" tries to be a modifier of every noun to the right, regardless of distance between the word "bike" and the nouns to the right of it in the phrase being parsed.

Unlike chart parsers, these possibilities are not parse informed; they are parse informing. There are no syntax or computational rules dictating the expression of the possibilities. They are not solutions to sub-problems. Not only are all possibilities considered valid, they are all considered equally valid. There is no mechanic to say that one data point is more or less valid than another.

In some implementations, links are used, such that each possible link is a raw representation of a possibility that is permitted by the data. A single dataset can form multiple links to the same word. If link "a" to "b" is valid, it remains valid in the initial parse even if there is another link set of "a" to "b" and "c". Overlaying links do not add to or subtract from validity; the link "a" to "b" is not made more valid by the link set of "a" to "b" and "c". The result of initially considering every possibility as equally valid is a series of possible parses that is pared down via a rule based elimination process.

The rule based elimination process is not based on prescriptive English grammar rules as it also has to work for agrammatical user inputs. Parses are eliminated via a two layered system. The collocate-based parse checks and verifies an environment-based parse, and vice versa. One type of usage data is used to eliminate usage data that contradicts another type. This mechanism generates an accurate parse without a statistical underpinning. It is supported by a very few descriptive phrase based rules.

Because the training corpus (e.g., the training data 117) is chatbot input data, each input is processed separately. The assumption is that, regardless of punctuation, the input is either a keyword search or a single sentence. This is because of the irregularity of punctuation in chatbot data. The expected behavior is that the parse may recognize a second sentence as a clause. This is considered satisfactory.

Figure 6:
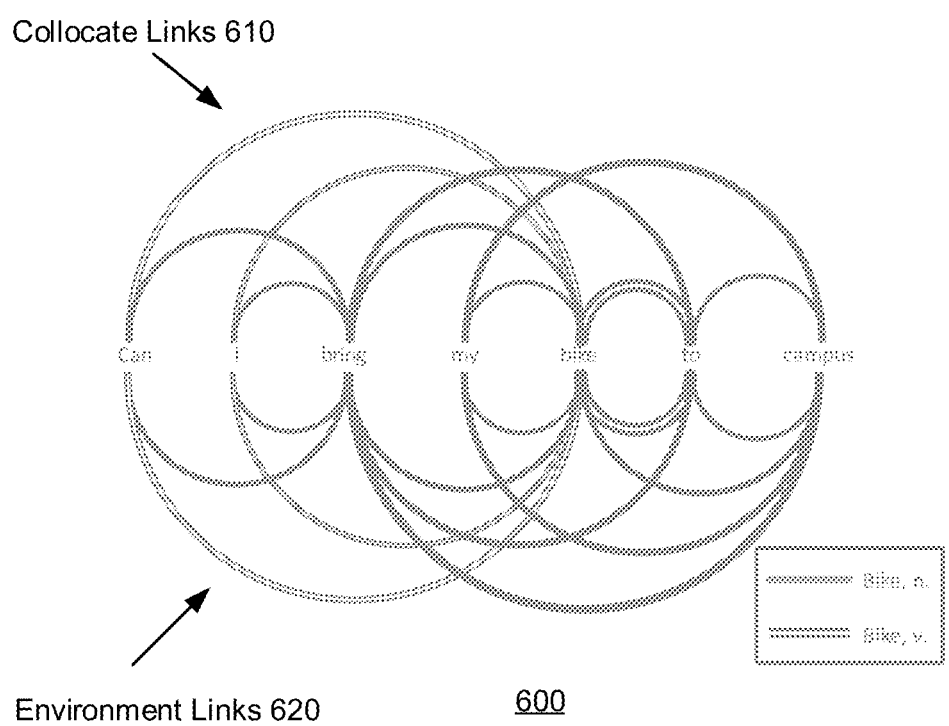
FIG. 6 is a diagram of a visual representation of all possible links for an example input.

For the first pass in the elimination process (e.g., of 570), collocates and environments are processed separately. FIG. 6 is a diagram 600 of a visual representation of all possible links for an example input, e.g., "Can I bring my bike to campus". All possible collocate links 610 (shown above the line of text in diagram 600) and all possible environment links 620 (shown below the line of text in diagram 600) are made (e.g., by the parser 126) as shown. This group of links represents all possible parses. Once all possible links are made, the elimination process repeats until the process affects no changes. When it is said that an link is eliminated, what is meant is that the environment or the collocate that creates that link is eliminated and is no longer present as a possibility.

After the general elimination process, verbal roles are considered as an eliminating element and more possibilities are eliminated. Then, the main elimination process is applied again. If there are any overlapping links at this point, a situational elimination process resolves these and the main elimination process is called once more.

This process has thus far proven enough to eliminate all links not caused by ambiguity. Take, for example, the phrase "Time flies like an arrow; fruit flies like a banana." The mechanism for eliminating invalid ambiguities is the predictive element present in the collocate data. Looking one step beyond the immediate connection, it sees that the noun "flies" has a verb like relationship to the noun "bananas". It also sees that "banana" has the same relationship to the noun "flies". A predictive relationship does not exist between fly, v. and banana. Due to this lack of predictive relationship, only the correct parse is returned.

Some ambiguities, such as those created by prepositional phrases, may not create conflicting links. In such a case, they are identified by the function defined for the preposition; that is, a preposition is only allowed to connect one word to another one word. Thus, if a preposition has more than one link to the left or right, it is marked as ambiguous and goes through the same disambiguation process.

There is no effort to completely disambiguate every parse. If an ambiguity is valid, the desired behavior is to return both parses.

Integration into a chatbot could involve either one parse of an ambiguity being comprehended by the chatbot via domain of knowledge and the other discarded by the chatbot, or the chatbot presenting the option of choosing the correct interpretation of an ambiguity.

After all conflicting links have been eliminated, only the valid collocates and environments are left for role extraction processing. When an ambiguity is returned, separate sets of collocates and environments are presented for role extraction processing, each set reflecting only the parse it is representing.

The first step in role extraction is to determine the main verbs and the clause markers and place them into separate clauses. Clause separation may be done by nested array where each item reflects a clause and inside the clause is nested all of the components of that clause. Any clause markers are put in with the main verb to its immediate left.

The roles are then assigned to their respective clauses via the environments. This may be done indiscriminately as all invalid roles should have been eliminated along with the environments assigning them. The only exception to this is the head role which will have been retained. Its clause position is determined by its direct link to the main verb.

The indirect object may get special attention in an implementation. Whereas a verb like "send" can assign its indirect object without a prepositional phrase, the typical expectation is that the indirect assignment will be the result of a prepositional phrase. In such a case, the preposition that links main verb to indirect object gets its own special role of indirect object preposition.

In some implementations, in the case of multiple agents, indirect objects or multiple direct objects, whether caused by a list or not, are given a numerical key (e.g., do1, do2). The indirect object preposition is given the same key as the indirect object so the two can be associated throughout the remainder of the parse.

Without a main verb, the only role that is permitted to be assigned is head. In such a situation, the highest level head is assigned the head role. This head role is assigned the keyword tag in some implementations, and if no roles are assigned, each word receives the keyword tag. In this way, if the user enters something even a human would not understand, the chatbot may be able to respond to some part of it.

When the roles have been assigned, the remaining step is to assign the modifying words as details of those roles. These are words that are directly linked to the roled word, but not assigned to any role. Each step away from the roled word is a detail of the detail.

Figure 7:
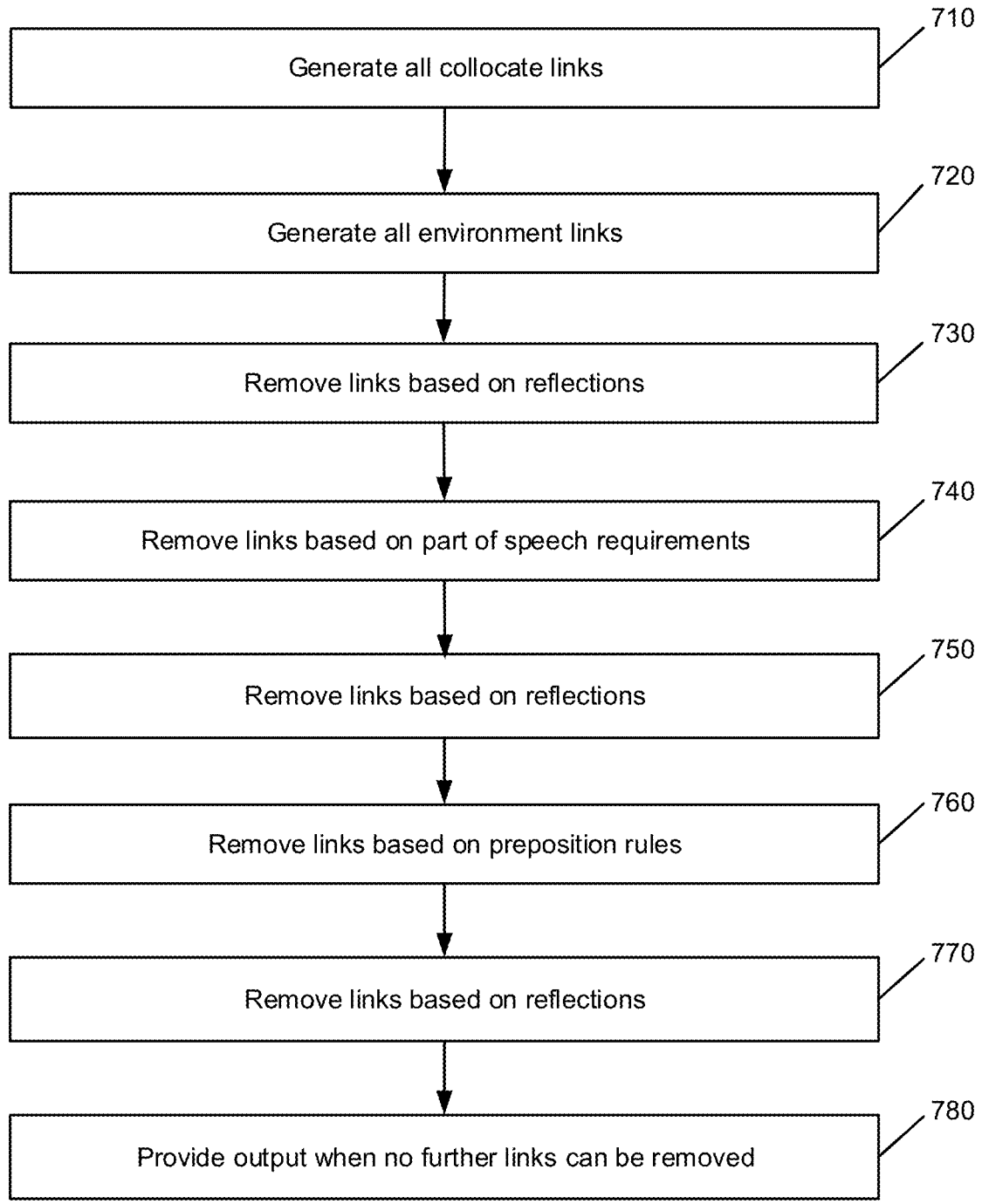
FIG. 7 is an operational flow of an implementation of a method for parsing using collocates and syntax environments.

FIG. 7 is an operational flow of an implementation of a method 700 for parsing using collocates and syntax environments, along with repeated reflection removal. At 710, collocate links for the word possibilities determined by the lemmatizer 123 are generated. At 720, environment links for the word possibilities determined by the lemmatizer 123 are generated.

Figure 8:
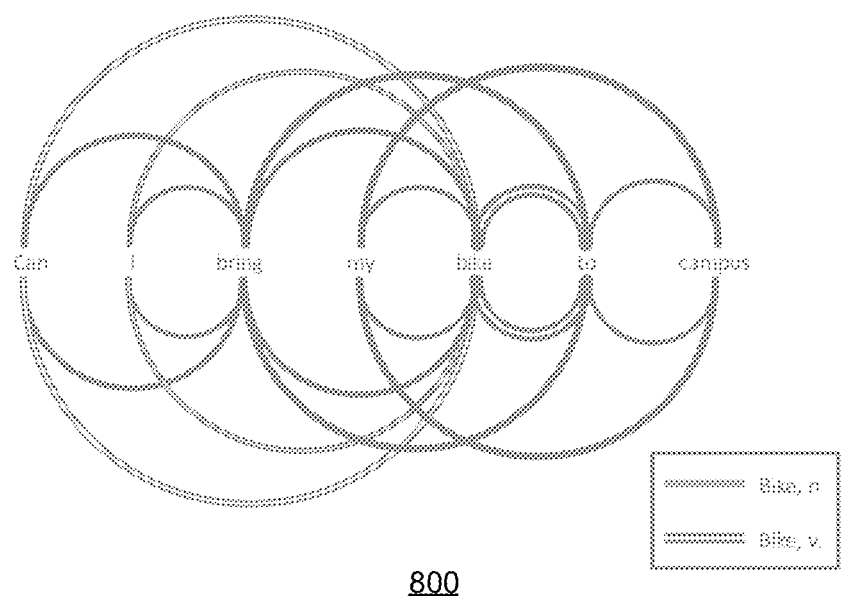
FIG. 8 is a diagram of a visual representation of the links of FIG. 6 after reflections have been removed.

Reflection links are identified and removed at 730. FIG. 8 is a diagram 800 of a visual representation of the links of FIG. 6 after reflections have been removed.

Figure 9:
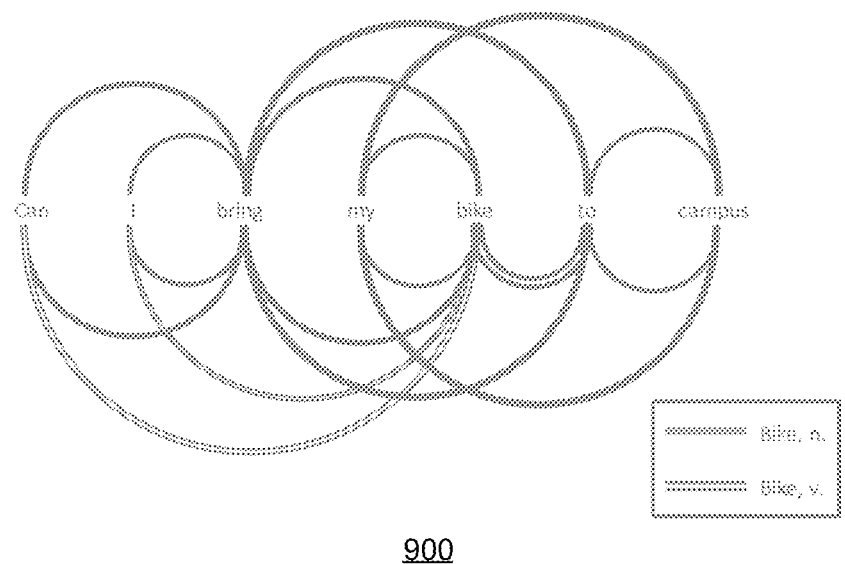
FIG. 9 is a diagram of a visual representation of the links of FIG. 8 after links based on part of speech requirements have been removed.

Links based in part of speech requirements are identified then removed at 740. FIG. 9 is a diagram 900 of a visual representation of the links of FIG. 8 after links based in part of speech requirements have been removed.

Figure 10:
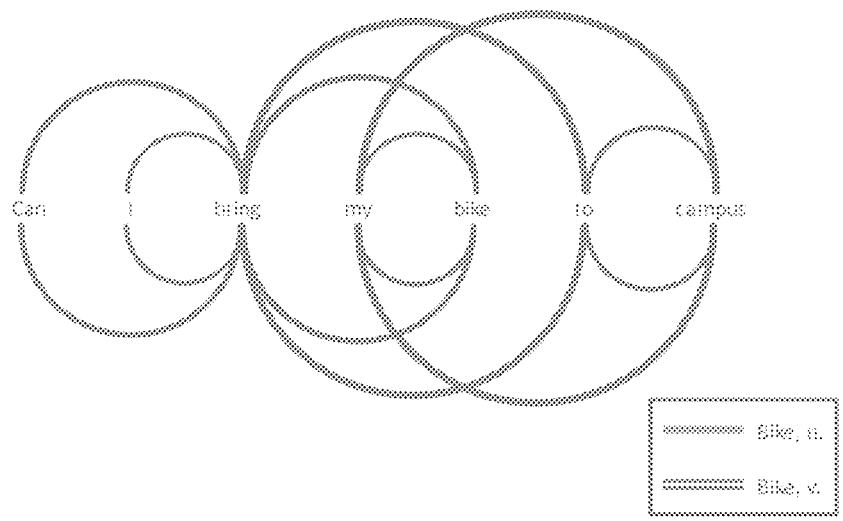
FIG. 10 is a diagram of a visual representation of the links of FIG. 9 after reflections have been removed.

Remaining reflection links are identified and removed at 750. FIG. 10 is a diagram 1000 of a visual representation of the links of FIG. 9 after reflections have been removed.

Figure 11:
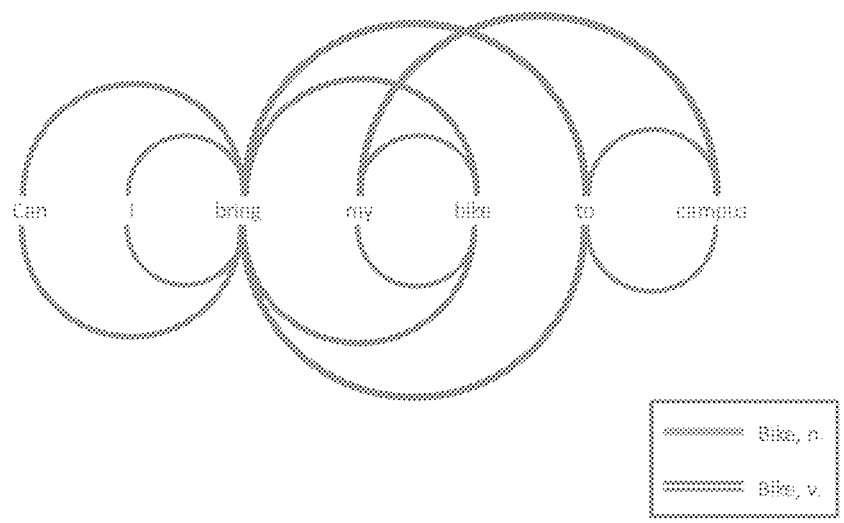
FIG. 11 is a diagram of a visual representation of the links of FIG. 10 after links based on prepositional rules have been removed.

Links based on prepositional rules are identified and removed at 760. FIG. 11 is a diagram 1100 of a visual representation of the links of FIG. 10 after links based on prepositional rules have been removed.

Figure 12:
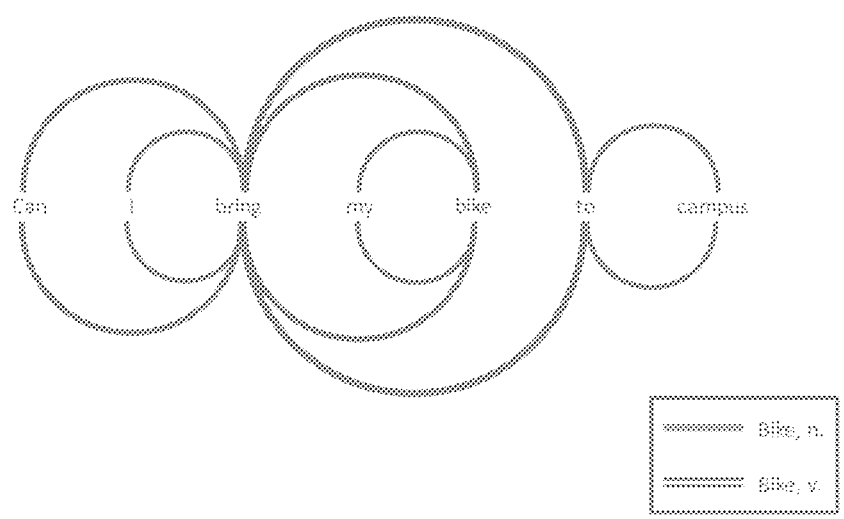
FIG. 12 is a diagram of a visual representation of the links of FIG. 11 after reflections have been removed.

Remaining reflection links are identified and removed at 770. FIG. 12 is a diagram 1200 of a visual representation of the links of FIG. 11 after reflections have been removed.

When no further links can be removed, the output is provided at 780.

FIG. 13 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 13, an exemplary system for implementing aspects described herein includes a computing device, such as computing device 1300. In its most basic configuration, computing device 1300 typically includes at least one processing unit 1302 and memory 1304. Depending on the exact configuration and type of computing device, memory 1304 may be volatile (such as random access memory (RAM)), non-volatile (such as read-only memory (ROM), flash memory, etc.), or some combination of the two. This most basic configuration is illustrated in FIG. 13 by dashed line 1306.

Computing device 1300 may have additional features/functionality. For example, computing device 1300 may include additional storage (removable and/or non-removable) including, but not limited to, magnetic or optical disks or tape. Such additional storage is illustrated in FIG. 13 by removable storage 1308 and non-removable storage 1310.

Computing device 1300 typically includes a variety of computer readable media. Computer readable media can be any available media that can be accessed by the device 1300 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1304, removable storage 1308, and non-removable storage 1310 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1300. Any such computer storage media may be part of computing device 1300.

Computing device 1300 may contain communication connection(s) 1312 that allow the device to communicate with other devices. Computing device 1300 may also have input device(s) 1314 such as a keyboard, mouse, pen, voice input device, touch input device, etc. Output device(s) 1316 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a parsing system is provided. The system includes a misspelling database that comprises a plurality of words and associated correct spellings of the plurality of words and alternate spellings of the plurality of words; a metadata from word form database comprising metadata associated with a plurality of word forms of the plurality of words; a usage data database comprising a plurality of collocates for the plurality of words and a plurality of syntax environments for the plurality of words; a spell checker that receives a user input and checks the user input against the misspelling database and generates a plurality of word possibilities; a lemmatizer that receives the plurality of word possibilities and checks the plurality of word possibilities against the word form database to adjust the plurality of word possibilities; and a parser that parses the plurality of word possibilities using the usage data database, generates a processed language output, and provides the processed language output to a chatbot.

Implementations may include some or all of the following features. The user input comprises one of chat data, a keyword search, or a non-conversational phrase. the user input comprises a tokenized agrammatical phrase. The processed language output comprises an action, an object, an actor, and an indirect object of the user input. The processed language output further comprises respective modifying details of the action, the object, the actor, and the indirect object. A training module that generates training data that populates the misspelling database, the metadata from word form database, and the usage data database. A probabilistic model that checks and adjusts the processed language output when the user input contains a word or a phrase that is unknown to the parser. The plurality of word possibilities generated by the spell checker comprises probable spellings of the user input, split contractions of the user input, separated out initialisms of the user input, normalized abbreviations of the user input, and resolved compounding errors of the user input. The metadata from the word form database comprises part of speech, tense, and root of a plurality of words. Each of the plurality of collocates comprises at least one of a direction, a left predictor, a part of speech, a role, or a right predictor. Each of the plurality of syntax environments identifies a plurality of parts of speech of a word that has a functional relationship to the word to the left and right of the word.

In an implementation, a method of parsing is provided. The method may include receiving a user input; determining a plurality of word possibilities of the user input using a plurality of words of the user input and associated correct spellings of the plurality of words and alternate spellings of the plurality of words; adjusting the plurality of word possibilities using metadata associated with at least some of the words in the plurality of word possibilities; parsing the adjusted plurality of word possibilities using a plurality of collocates and a plurality of syntax environments to generate a processed language output; and providing the processed language output to a chatbot.

Implementations may include some or all of the following features. The user input comprises one of chat data, a keyword search, a non-conversational phrase, or a tokenized agrammatical phrase. Tokenizing the user input prior to determining the plurality of word possibilities. The processed language output comprises at least one of an action of the user input, an object of the user input, an actor of the user input, an indirect object of the user input, or one or more modifying details of the action, the object, the actor, or the indirect object. At least one of checking or adjusting the processed language output using a probabilistic model prior to providing the processed language output to the chatbot. Each of the plurality of collocates comprises at least one of a direction, a left predictor, a part of speech, a role, or a right predictor, and wherein each of the plurality of syntax environments identifies a plurality of parts of speech of a word that has a functional relationship to the word to the left and right of the word.

In an implementation, a system is provided. The system includes: a parser that receives an input comprising a plurality of words, generates a plurality of collocate links among the plurality of words, generates a plurality of environment links among the plurality of words, removes at least one of the plurality of the collocate links or the environment links, and provides a processed language output; and a memory.

Implementations may include some or all of the following features. The memory stores a misspelling database that comprises a plurality of words and associated correct spellings of the plurality of words and alternate spellings of the plurality of words, a word form database comprising metadata associated with a plurality of word forms of the plurality of words, and a usage data database comprising a plurality of collocates for the plurality of words and a plurality of syntax environments for the plurality of words. The input comprises one of chat data, a keyword search, a non-conversational phrase, or a tokenized agrammatical phrase, and the processed language output comprises at least one of an action of the input, an object of the input, an actor of the input, an indirect object of the input, or one or more modifying details of the action, the object, the actor, or the indirect object.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A parsing system comprising:
   a chatbot that receives a user input; and
   an experiential parser, wherein the experiential parser comprises:
     a misspelling database that comprises a plurality of words and associated correct spellings of the plurality of words and alternate spellings of the plurality of words;
     a metadata from word form database comprising metadata associated with a plurality of word forms of the plurality of words;
     a usage data database comprising a plurality of collocates for the plurality of words and a plurality of syntax environments for the plurality of words;
     a spell checker that receives a user input and checks the user input against the misspelling database and generates a plurality of word possibilities;
     a lemmatizer that receives the plurality of word possibilities and checks the plurality of word possibilities against the word form database to adjust the plurality of word possibilities; and
     a parser that parses the plurality of word possibilities using the usage data database, generates a processed language output, and provides the processed language output to a chatbot.

2. The system of claim 1, wherein the user input comprises one of chat data, a keyword search, or a non-conversational phrase.

3. The system of claim 1, wherein the user input comprises a tokenized agrammatical phrase.

4. The system of claim 1, wherein the processed language output comprises an action, an object, an actor, and an indirect object of the user input.

5. The system of claim 4, wherein the processed language output further comprises respective modifying details of the action, the object, the actor, and the indirect object.

6. The system of claim 1, further comprising a training module that generates training data that populates the misspelling database, the metadata from word form database, and the usage data database.

7. The system of claim 1, further comprising a probabilistic model that checks and adjusts the processed language output when the user input contains a word or a phrase that is unknown to the parser.

8. The system of claim 1, wherein the plurality of word possibilities generated by the spell checker comprises probable spellings of the user input, split contractions of the user input, separated out initialisms of the user input, normalized abbreviations of the user input, and resolved compounding errors of the user input.

9. The system of claim 1, wherein the metadata from the word form database comprises part of speech, tense, and root of a plurality of words.

10. The system of claim 1, wherein each of the plurality of collocates comprises at least one of a direction, a left predictor, a part of speech, a role, or a right predictor.

11. The system of claim 1, wherein each of the plurality of syntax environments identifies a plurality of parts of speech of a word that has a functional relationship to the word to the left and right of the word.

12. A method of parsing, the method comprising:
receiving a user input at a chatbot;
determining a plurality of word possibilities of the user input using a plurality of words of the user input and associated correct spellings of the plurality of words and alternate spellings of the plurality of words, by an experiential parser;
adjusting the plurality of word possibilities using metadata associated with at least some of the words in the plurality of word possibilities, by the experiential parser;
parsing the adjusted plurality of word possibilities using a plurality of collocates and a plurality of syntax environments to generate a processed language output, by the experiential parser; and
providing the processed language output to the chatbot, by the experiential parser.

13. The method of claim 12, wherein the user input comprises one of chat data, a keyword search, a non-conversational phrase, or a tokenized agrammatical phrase.

14. The method of claim 12, further comprising tokenizing the user input prior to determining the plurality of word possibilities.

15. The method of claim 12, wherein the processed language output comprises at least one of an action of the user input, an object of the user input, an actor of the user input, an indirect object of the user input, or one or more modifying details of the action, the object, the actor, or the indirect object.

16. The method of claim 12, further comprising at least one of checking or adjusting the processed language output using a probabilistic model prior to providing the processed language output to the chatbot.

17. The method of claim 12, wherein each of the plurality of collocates comprises at least one of a direction, a left predictor, a part of speech, a role, or a right predictor, and wherein each of the plurality of syntax environments identifies a plurality of parts of speech of a word that has a functional relationship to the word to the left and right of the word.

* * * * *